US010067346B2

(12) United States Patent
Travis (10) Patent No.: US 10,067,346 B2
(45) Date of Patent: Sep. 4, 2018

(54) HOLOGRAPHIC DISPLAY (71) Applicant: Microsoft Technology Licensing, LLC, Redmond, WA (US)

(72) Inventor: Adrian Travis, Seattle, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 315 days.

(21) Appl. No.: 14/921,864

(22) Filed: Oct. 23, 2015

(65) Prior Publication Data

US 2017/0115487 A1   Apr. 27, 2017

(51) Int. Cl.
*G02B 27/01* (2006.01)
*G03H 1/02* (2006.01)
*G06F 3/01* (2006.01)
*G06F 3/00* (2006.01)

(52) U.S. Cl.
CPC ..... *G02B 27/0172* (2013.01); *G02B 27/0179* (2013.01); *G03H 1/0256* (2013.01); *G06F 3/005* (2013.01); *G06F 3/013* (2013.01); *G02B 2027/014* (2013.01); *G02B 2027/0138* (2013.01); *G02B 2027/0174* (2013.01); *G02B 2027/0187* (2013.01); *G03H 2250/38* (2013.01)

(58) Field of Classification Search
CPC ............ G02B 27/0172; G02B 27/0179; G02B 2027/0187; G02B 2027/014; G02B 2027/0138; G02B 2027/0174; G06F 3/005; G06F 3/013; G03H 1/0256; G03H 2250/38
See application file for complete search history.

(56) References Cited

U.S. PATENT DOCUMENTS 5,422,873 A    6/1995  Kewitsch et al.
6,204,829 B1   3/2001  Tidwell
6,285,505 B1*  9/2001  Melville ............... G02B 7/287
                                                351/206
(Continued)

FOREIGN PATENT DOCUMENTS

WO    2000028369 A2    5/2000
WO      0109685 A1     2/2001
(Continued)

OTHER PUBLICATIONS

Chung-Sheng Chiang, et al, Multiple-hologram recording with one-beam encoding, 2012, Opics Express, vol. 20, No. 7.*
(Continued)

*Primary Examiner* — Joseph Suh
(74) *Attorney, Agent, or Firm* — Allenman Hall Creasman & Tuttle LLP (57) ABSTRACT A display device includes an optical sensor configured to image a user eye, an image source configured to provide image light, a holographic film including a plurality of holograms, and a controller. Each hologram is recorded with a same reference beam but recorded differently so as to differently diffract image light received from the light source. The controller is configured to determine, via the optical sensor, a position of the user eye, and adjust, based on the determined position of the user eye, a state of the holographic film such that a particular hologram of the plurality of holograms diffracts image light to the position of the user eye.

15 Claims, 7 Drawing Sheets

(56) References Cited

U.S. PATENT DOCUMENTS

| | | | |
|---|---|---|---|
| 6,699,407 B1* | 3/2004 | Sutehrland | C09K 19/544 252/299.01 |
| 8,639,072 B2* | 1/2014 | Popovich | G02B 27/017 359/558 |
| 8,699,137 B2 | 4/2014 | McGrew | |
| 2001/0043163 A1 | 11/2001 | Waldern et al. | |
| 2010/0149073 A1 | 6/2010 | Chaum et al. | |
| 2013/0077024 A1* | 3/2013 | Shikii | G02B 17/004 349/62 |
| 2013/0234935 A1 | 9/2013 | Griffith | |
| 2014/0168735 A1 | 6/2014 | Yuan et al. | |
| 2014/0232651 A1* | 8/2014 | Kress | G02B 27/0172 345/158 |
| 2014/0232746 A1* | 8/2014 | Ro | H04N 13/0402 345/633 |
| 2014/0268277 A1 | 9/2014 | Georgiou et al. | |
| 2014/0362446 A1* | 12/2014 | Bickerstaff | G02B 27/017 359/630 |
| 2016/0075164 A1* | 3/2016 | Sarrazin | D21H 21/44 283/94 |
| 2016/0087135 A1* | 3/2016 | Horimai | E06B 9/24 136/259 |
| 2016/0093113 A1* | 3/2016 | Liu | G06F 3/013 345/156 |
| 2016/0306089 A1* | 10/2016 | Morgott | F21V 5/003 |
| 2016/0320624 A1* | 11/2016 | Yamaoka | B60K 35/00 |

FOREIGN PATENT DOCUMENTS

| | | | |
|---|---|---|---|
| WO | 2013167864 A1 | 11/2013 | |
| WO | 2014188149 A1 | 11/2014 | |

OTHER PUBLICATIONS

ISA European Patent Office, International Search Report and Written Opinion Issued in PCT Application No. PCT/US2016/055386, dated Dec. 16, 2016, WIPO, 15 pages.

Sutherland, et al., "Liquid Crystal Bragg Gratings for High-Brightness Spatial Light Modulators", In Journal of SPIE Newsroom, Nov. 24, 2007, pp. 1-3.

Sagan, et al., "Electrically Switchable Bragg Grating Technology for Projection Displays", In Proceedings of SPIE—The International Society for Optical Engineering, Mar. 2001, 2 pages.

Donisit, et al., "Novel Tuneable Optical Filter made of a Polymer and Liquid Crystal Holographic Grating on Glass Waveguides", In Proceedings of European Conference on Lasers and Electro-Optics, and the International Quantum Electronics Conference, Jun. 17, 2007, 1 pages.

Schwerdtner, et al., "Eye-Tracking Solutions for Real-Time Holographic 3-D Display", In SID Symposium Digest of Technical Papers, vol. 39, Issue 1, May 2008, pp. 345-347.

Kim, et al., "Multi-View Three-Dimensional Display System by Using Arrayed Beam Steering Devices", In SID Symposium Digest of Technical Papers, vol. 45, Issue 1, Jun. 2014, 3 pages.

Kolle, et al., "Stretch-Tuneable Dielectric Mirrors and Optical Microcavities", In Journal of Optics Express, vol. 18, Issue 5, Mar. 2010, pp. 4356-4364.

Sioa, et al., "POLICRYPS Composite Structures: Realization, Characterization and Exploitation for Electro-Optical and All-Optical Applications", In Journal of Liquid Crystals Reviews, vol. 1, Issue 1, Mar. 7, 2013, 2 pages.

Stumpe, et al., "Electrically Tunable Diffractive Optical Elements and DFB Lasers based on Polymer-LC Composites and Elastomers", In Proceedings of 23rd Micromechanics and Microsystems Europe Workshop, Sep. 9, 2012, 4 pages.

"International Preliminary Report on Patentability Issued in PCT Application No. PCT/US2016/055386", dated Jan. 16, 2018, 10 Pages.

"Second Written Opinion Issued in PCT Application No. PCT/US2016/055386", dated Sep. 12, 2017, 6 Pages.

* cited by examiner

HOLOGRAPHIC DISPLAY

BACKGROUND

A display device may project holographically-generated virtual images to provide an immersive experience to a viewer. A virtual image may be holographically generated in various ways. For example, a display device may use a holographic film recorded with a hologram to deliver a virtual image to a user's eye. In particular, the hologram may be illuminated with image light at a reference angle and the hologram may diffract the image light at an angle that intersects the user's eye.

DETAILED DESCRIPTION

As discussed above, display devices may be configured to project virtual images to a user's eye by providing image light to a hologram recorded in a holographic film. When the image light is provided to the hologram at a reference angle, the hologram diffracts the image light at a particular outbound angle. If the user's pupil is in a position such that light rays at the outbound angle intersect the pupil, the user is able to view the virtual image. However, if the pupil moves away from this position (e.g., if the user eye looks left, right, up or down), then the virtual image is no longer viewable by the user's eye. In other words, the nature of the holographic film is such that the virtual image is viewable with only a single, or very limited range of, pupil positions.

Accordingly, this description relates to projecting a virtual image to a user's eye such that the virtual image can be viewed from a variety of different pupil positions. In many examples, an initial step is to determine a position of a user eye. Image light is provided to a holographic film that includes multiple different holograms. Each hologram is recorded with the same reference beam, but the individual holograms are recorded differently. The differential recording is performed so that, for image light inbound at a given reference angle, each hologram diffracts the image light differently. In other words, each hologram differently "aims" or "redirects" light coming in at this inbound reference angle so that the light exits at a different diffraction angle. A state of the holographic film may be adjusted based on the determined position of the user's eye. The adjustment may cause a particular hologram to be illuminated/activated, the hologram being selected based on it having a diffraction angle that intersects the determined position of the user's eye. By adjusting the state of the holographic film to illuminate a particular hologram based on the position of the pupil of the user eye, the system enables viewing of virtual images even as the pupil significantly changes positions.

Figure 1:
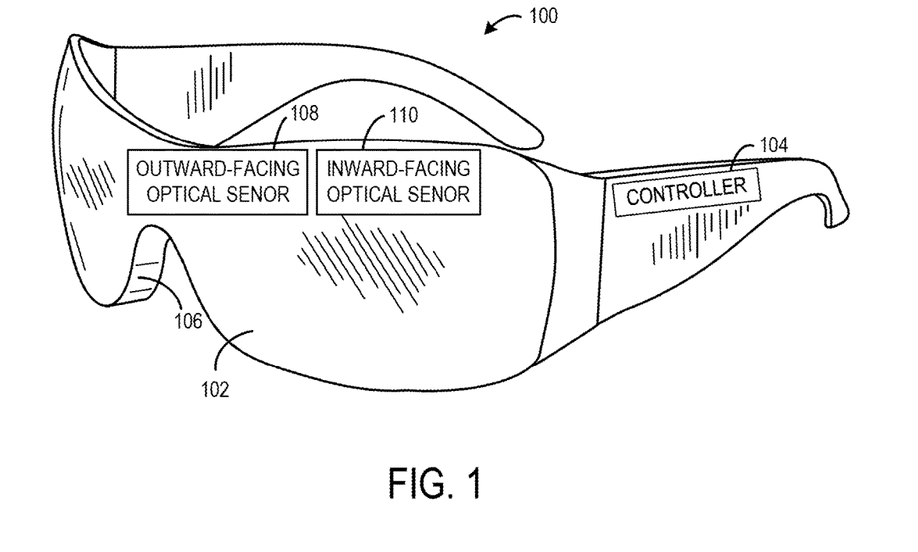
FIG. 1 shows an example near-eye display device.

FIG. 1 shows an example display device that may include one or more of the example optical systems described herein. More particularly, FIG. 1 shows an example head-mounted display (HMD) device 100 in the form of a pair of wearable glasses with a near-eye display 102. The HMD device 100 is shown in simplified form. In some implementations, the near-eye display 102 may be at least partially see-through such that virtual images may appear to augment a real-world environment viewable through the near-eye display 102. In other implementations, the near-eye display 102 may be an occluding, virtual reality display. A near-eye display device may take any other suitable form than the example shown. Moreover, the concepts discussed herein may be broadly applicable to other types of display devices, such as large format display devices.

The HMD device 100 includes a controller 104 configured to control operation of the display 102. Control of operation of the display 102 may be additionally or alternatively controlled by one or more computing devices (e.g., remote from the HMD device 100) in communication with the HMD device 100. The controller 104 may include a logic device and a storage device, as discussed in more detail below with respect to FIG. 9. The logic device and storage device may be in communication with various sensors and display system components of the HMD device 100.

The HMD device 100 also includes a holographic display system 106 controlled by the controller. Example display systems for use with holographic display system 106 are described in more detail below with reference to FIGS. 2A-2B.

The HMD device 100 may also include various sensors and related systems to provide information to the controller 104. Such sensors may include, but are not limited to, one or more outward facing image sensors 108 and one or more inward facing image sensors 110.

The one or more outward facing image sensors 108 may be configured to measure attributes of the physical environment in which the HMD device 100 is located. Such visual data of the physical environment may be used to provide video-based augmented reality display data to the holographic display system 106. In one example, a live or semi-live video/image feed of the user's real-world environment, as imaged by the outward facing image sensors 108, may be displayed via the holographic display system 106 to simulate a see-through display system. Virtual objects may be displayed over the images of the real-world environment to present an augmented reality scene to the user. In another example, the outward facing image sensors 108 may image the real-world environment for position tracking and mapping of objects in the real-world environment.

In one example, the one or more image sensors 108 may include a visible-light camera configured to collect a visible-light image of a physical space. Further, the one or more image sensors 108 may include a depth camera configured to collect a depth image of a physical space. More particularly, in one example, the depth camera is an infrared time-of-flight depth camera. In another example, the depth camera is an infrared structured light depth camera.

The one or more inward facing image sensors 110 may be configured to acquire image data in the form of gaze tracking data from a wearer's eyes. The controller 104 of the HMD device 100 may be configured to determine gaze directions of each of a wearer's eyes in any suitable manner based on the information received from the image sensors 110. For example, one or more light sources such as infrared light sources may be configured to cause a glint of light to reflect from the cornea of each eye of a wearer. The one or more image sensors 110 may then be configured to capture an image of the wearer's eyes. These images of the glints and of the pupils may be used by the controller 104 to determine an optical axis of each eye. Using this information, the controller 104 may be configured to determine a direction the wearer is gazing (also referred to as a gaze vector). In one example, the one or more light sources, the one or more inward facing image sensors 110, and the controller 104 may collectively comprise a gaze detector. This gaze detector may be configured to determine a position of a user eye, a gaze vector, a pupil position, head orientation, eye gaze velocity, eye gaze acceleration, change in angle of eye gaze direction, and/or any other suitable tracking information of the user eye. In other implementations, a different type of gaze detector/sensor may be employed in the HMD device 100 to measure one or more gaze parameters of the user's eyes. In some implementations, eye gaze tracking may be recorded independently for each eye of a wearer of the HMD device 100.

In one particular example, a pupil of a human eye may have a minimum diameter of about 2 millimeters. At that size, the pupil can move to a discrete number of independent (e.g., not overlapping) positions. In some cases, there may be up to forty independent positions. Accordingly, the controller 104 may be configured to identify which position, of the possible forty positions, the pupil is in.

The controller 104 may be configured to adjust a state of the holographic display system 106 based on a determined position of the user eye. This adjustment may allow a virtual image to be viewed from the determined position. In particular, the controller 104 may adjust a state of a holographic film of the holographic display system 106 to diffract image light to intersect the position of the user eye as will be discussed in further detail below.

Figure 2A:
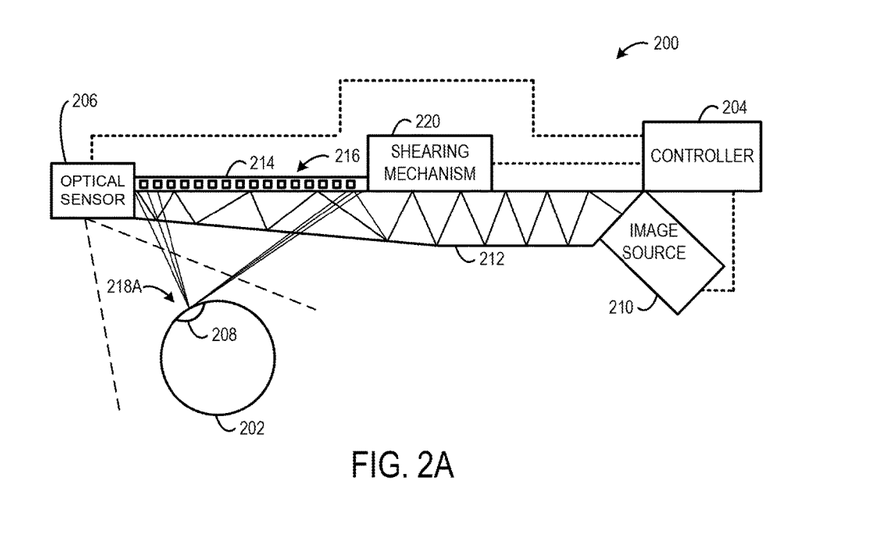
FIGS. 2A-2B shows an example optical system for a near-eye display device.
Figure 2B:
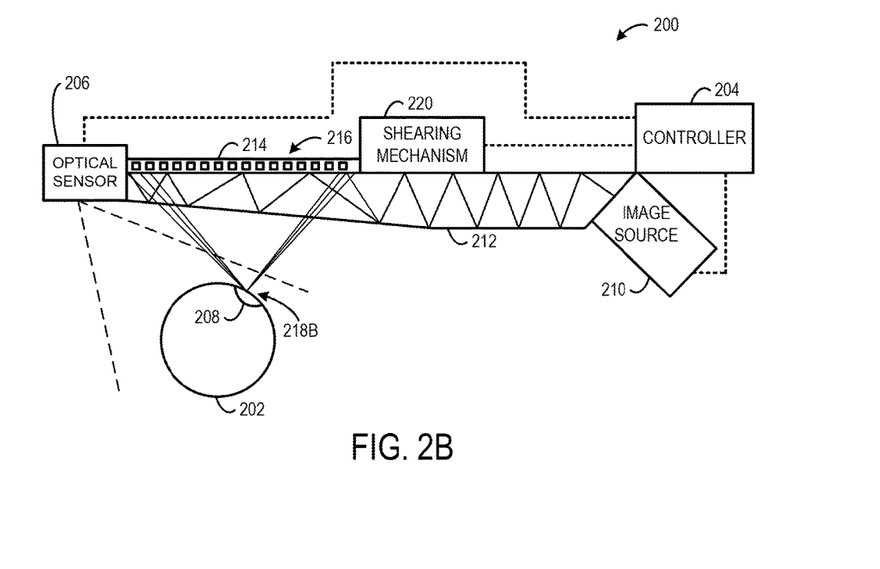

FIGS. 2A-2B show an example optical system 200 in simplified form. In one example, the optical system 200 may be employed in the holographic display system 106 for the HMD device 100 of FIG. 1, or any other suitable display device. The optical system 200 includes optical elements arranged in front of, or near, a user eye 202. A controller 204 controls operation of the optical system 200 to, among other things, determine a position of the user eye 202 and adjust a state of the optical system to direct image light to the user eye 202.

The optical system 200 includes an optical sensor 206 for imaging the user eye 202. The controller 204 may determine a position of a pupil 208 (or another aspect) of the user eye 202 based on image data received from the optical sensor 206. In one example, the optical sensor 206 corresponds to the one or more inward facing image sensors 110 shown in FIG. 1. The controller 204 may determine the position of the pupil 208 as described above, or in any other suitable manner.

The optical system 200 includes an image source 210 configured to output image light to a waveguide 212. The image source 210 may take any suitable form. The image source 210 may employ various image formation technologies including, but not limited to, a liquid crystal display (LCD), a liquid crystal on silicon (LCOS) display, or another suitable display technology. The image source 210 may employ any suitable backlight or other illumination source. In one example, the image source 210 may include one or more laser light sources (e.g., laser diodes) to provide spatially coherent image light to the waveguide 212. A laser has a narrow linewidth (e.g., emits light at a single wavelength), that produces little or no rainbow effect when diffracted by a hologram.

The image source 210 may provide image light to the waveguide 212 in any suitable manner. For example, the image source 210 may provide image light via an input coupling prism, embossed grating, volume hologram, slanted diffraction grating, or other coupling grating or hologram. In the illustrated implementation, the image source 210 provides image light to the waveguide 212 at a fixed angle of incidence. However, in other implementations, the image source 210 may vary the angle of incidence at which image light is provided to the waveguide 212.

The waveguide 212 may be configured to propagate image light received from the image source 210 to a field of view of the user eye 202. In particular, image light may propagate through the waveguide 212 until eventually exceeding a total internal reflection (TIR) critical angle after a certain number of reflections. Once the critical angle is exceeded, the image light exits the waveguide 212. The waveguide 212 may take any suitable form. In the illustrated implementation, the waveguide 212 has a wedge shape. In other implementations, the waveguide 212 may have a constant thickness instead of a wedge shape.

A holographic film 214 may be configured to receive image light exiting the waveguide 212. In one example, the holographic film 214 is adjacent the waveguide 212 in the field of view of the user, though the holographic film may be situated in any suitable manner/location. The holographic film 214 includes a plurality of different holograms 216. In one example, each hologram 216 is a Bragg grating. Each hologram 216 may be recorded in the holographic film 214 with the same reference beam. In other words, in one example with N holograms, hologram 1 is recorded using reference beam R; hologram 2 is recorded using the same reference beam R; and so on through hologram N. However, each of these holograms maybe recorded differently so as to differently diffract image light received from the waveguide 212 at the reference angle. In particular, each hologram 216 may be recorded in such a manner that each hologram 216 diffracts image light at a different angle. For example, the different angles of diffraction of the different holograms 216 may intersect different possible positions of the pupil 208. In one example, a number of holograms 216 of the holographic film 214 may correspond to the total number of possible pupil positions (e.g., 37-40) of the user eye 202.

The controller 204 may be configured to adjust a state of the holographic film 214 based on a position 218 of the user eye 202, as determined via the optical sensor 206. In particular, the controller 204 may adjust the state of the holographic film 214 such that a particular one of the holograms 216 is selected/activated/excited to diffract image light to intersect the determined position 218 of the user eye 202. In such a state of the holographic film 214, the other non-active holograms do not diffract the image light to the position of the user eye. Instead, the non-active holograms transmit the image light.

By varying the state of the holographic film 214 to select different holograms that diffract image light differently, the optical system 200 may provide image light selectively to a range of possible positions of the pupil 208. For example, as shown in FIG. 2A, the pupil 208 is oriented at a first position 218A. The controller 204 determines, via optical sensor 206, that the pupil is in this first position 218A, and in response adjusts a state of the holographic film 214. The state adjustment of the holographic film excites a first hologram having a particular angle of diffraction that diffracts the image light to intersect the position 218A.

In another example (FIG. 2B), the pupil 208 is oriented in a second position 218B. The controller 204 determines the second position 218B (e.g., via optical sensor 206), and adjusts a state of the holographic film 214 to excite a second, different hologram. The second hologram has a particular angle of diffraction that diffracts the image light to intersect the position 218B, and is selected/activated for that reason. In other words, the controller 204 adjusts the state of the holographic film 214 responsive to a change in pupil position so that image light is provided to the pupil at the changed pupil position. In particular, with each change in pupil position, a different hologram 216 of the holographic film 214 may be excited to appropriately diffract image light to the pupil 208 as it moves.

The plurality of holograms 216 may be recorded in the holographic film 214 in any suitable manner. In one example, each hologram 216 is recorded with the same reference beam, but with the holographic film 214 being subject to a different amount of shear. Shear may include any suitable amount of unaligned forces applied to one part of the holographic film 214 in one direction, and another part of the holographic film 214 in the opposite direction. The shear force(s) may be applied to the holographic film 214 in any suitable manner. By adjusting the amount of shear applied to the holographic film 214 for each recording, the angle of diffraction can be varied for each hologram, e.g., so that each hologram has a diffraction angle that is different from one or more of the others. In other words, multiple instances of the same hologram (e.g., having the same reference and signal) may be recorded on the holographic film 214, and each hologram may be oriented differently based on a different amount of shear applied during recording of the hologram.

In one particular example, the holographic film 214 may be recorded by generating a reference beam and a signal to create a desired holographic interference pattern. For example, the reference beam may include planar wave fronts. For a Bragg grating, the signal also may include planar wave fronts, for example. For a 3D image, the signal may include light scattered off a 3D object, for example. The interference pattern may be printed on an ion beam machine. The printed interference pattern may be placed proximate to a thick photosensitive film, such as dichromated gelatin or silver halide. The substrate of the film may be illuminated via a laser until the hologram has been copied into the substrate. In one example, the copy process is repeated to record each hologram in the film, and for each recording, a different amount of shear is to be applied to the film. In another example, a master volume hologram is printed that includes all of the different holograms, allowing the master volume hologram to be copied into the substrate of the photosensitive film in a single recording step.

In implementations of the optical system 200 that employ the holographic film 214 including different holograms recorded with different amounts of shear being applied to the holographic film 214, the state of the holographic film 214 may be altered by adjusting an amount of shear applied to the holographic film 214.

Figure 3:
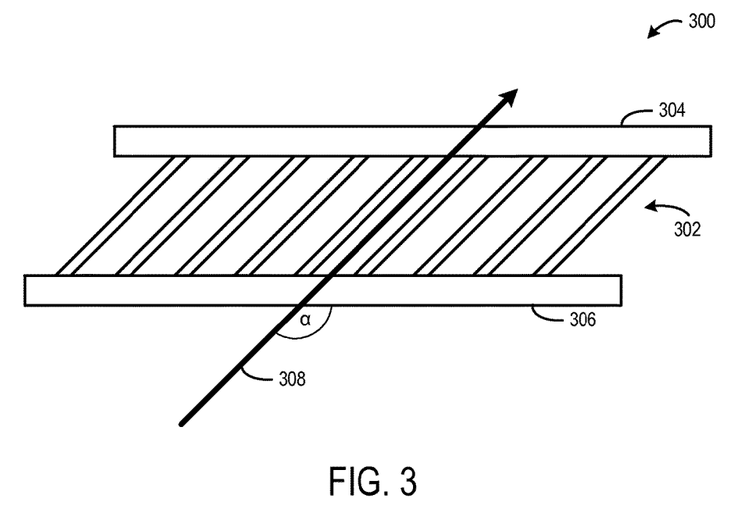
FIG. 3 shows an example holographic film in a state to transmit image light.
Figure 4:
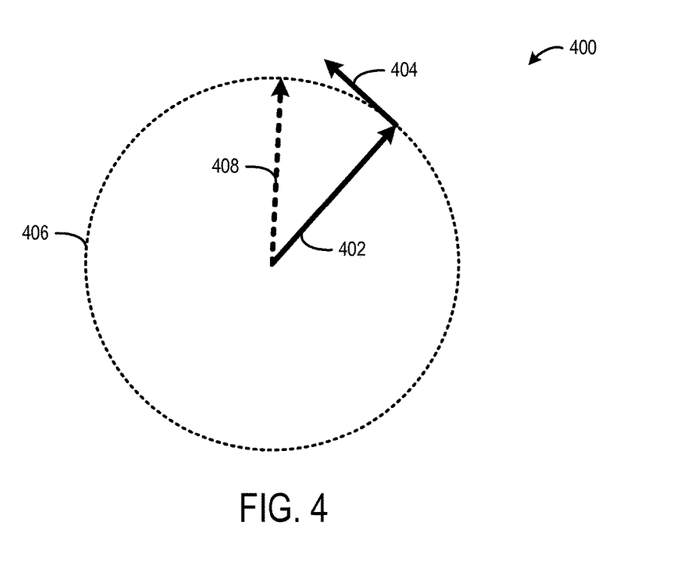
FIG. 4 shows an example vector diagram corresponding to the state of the holographic film of FIG. 3.
Figure 5:
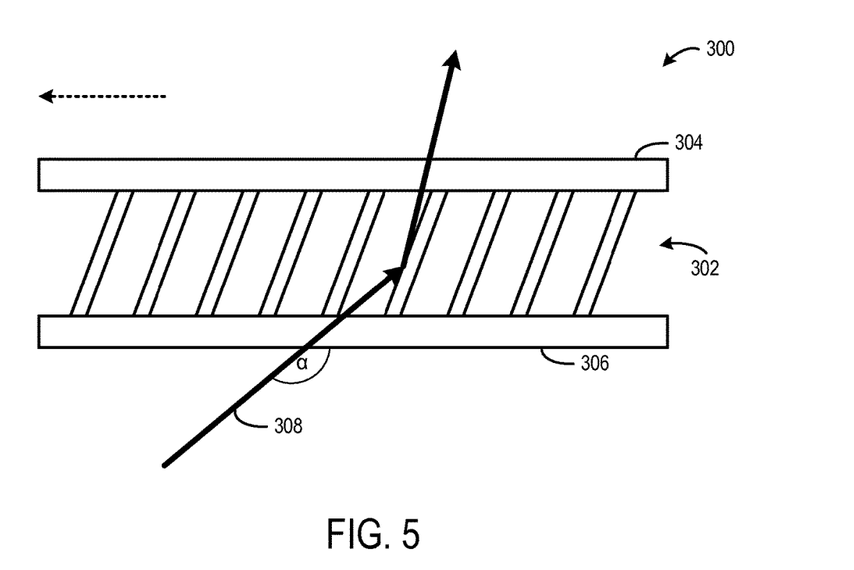
FIG. 5 shows an example holographic film in a state to diffract image light.
Figure 6:
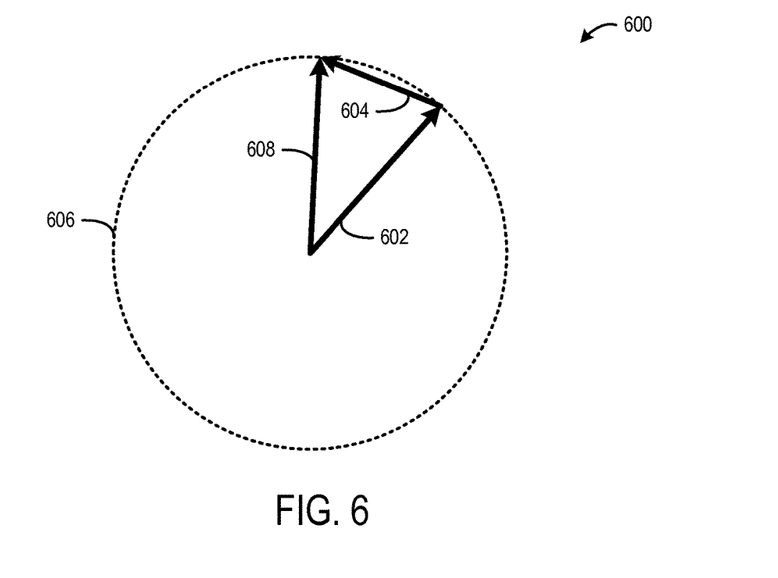
FIG. 6 shows an example vector diagram corresponding to the state of the holographic film of FIG. 5.

FIGS. 3 and 5 schematically show an example holographic film 300 under different amounts of shear that affect an operating state of a hologram 302 of the holographic film 300. FIGS. 4 and 6 show vector diagrams corresponding to the hologram 302 under different amounts of shear, and will be referenced throughout discussion of the hologram 302.

FIG. 3 shows the holographic film 300 under a larger amount of shear relative to that shown in FIG. 5. Specifically, a top surface 304 of the holographic film 300 (e.g., a Bragg grating) is shifted in an opposite direction relative to a bottom surface 306 of the holographic film 300. A light ray 308 is provided to the holographic film 300 at an angle (α). Application of the larger amount of shear to the holographic film 300 distorts the holographic film 300. In particular, the distortion of the holographic film 300 causes the planes of the Bragg grating to rotate relative to the angle (α) of light ray 308. As such light ray 308 is incident on the hologram 302 at an angle different than the reference angle, and light ray 308 is transmitted through the hologram 302 without being diffracted. In other words, the hologram 302 is in a non-active state in which the hologram 302 acts transparent to the light ray 308

FIG. 4 shows a vector diagram 400 corresponding to the hologram 302 when the holographic film 300 is subjected to the larger amount of shear, as shown in FIG. 3. A reference vector 402 corresponds to the light ray 308 shown in FIG. 3. Reference vector 402 has a length equal to a reciprocal of the wavelength of the light ray 308. Vector 402 has a direction perpendicular to the wave front of the light ray 308. A hologram vector 404 corresponds to the hologram 302 shown in FIG. 3. Hologram vector 404 has a length equal to a reciprocal of the distance between the planes of hologram 302. Hologram vector 404 has a direction perpendicular to the planes of the hologram 302. A circle 406 of constant radius is formed from a combination of a signal vector 408 and the reference vector 402 that were used to record the hologram 302. In this case, the hologram vector 404 is not aligned with the circle 406 of constant radius (e.g., the ends of the vector do not lie on the perimeter of the circle). As such, light ray 308 is incident on the hologram 302 at an angle different from the reference angle, and the hologram 302 does not diffract light ray 308 as shown in FIG. 3.

FIG. 5 shows the holographic film 300 under a smaller amount of shear relative to that shown in FIG. 3. In particular, the top surface 304 of the holographic film 300 (e.g., a Bragg grating) is shifted in an opposite direction relative to the bottom surface 306 of the holographic film 300 to a lesser extent than in FIG. 3. The light ray 308 is provided to the holographic film 300 at the same angle (α) as shown in FIG. 3. Application of the smaller amount of shear to the holographic film 300 distorts the holographic film 300 to a lesser extent. In particular, the distortion of the holographic film 300 causes the planes of the Bragg grating to rotate relative to the angle (α) of the light ray 308 such that the light ray 308 is incident on the hologram 302 at the reference angle. As such, light ray 308 is incident on the hologram 302 at the reference angle, and light ray 308 is diffracted by the hologram 302. In other words, the hologram 302 may be in an excited state in which the hologram 302 diffracts the light ray 308.

FIG. 6 shows a vector diagram 600 corresponding to the hologram 302 when the holographic film 300 is subjected to the smaller amount of shear as shown in FIG. 5. A reference vector 602 corresponds to the light ray 308 shown in FIG. 5. A hologram vector 604 corresponds to the hologram 302 shown in FIG. 5. A circle 606 of constant radius is formed from a combination of a signal vector 608 and the reference vector 602 that were used to record the hologram 302. In this case, the hologram vector 604 is aligned with the circle 606 of constant radius (e.g., the ends of the vector do lie on the perimeter of the circle). As such, light ray 308 is incident on the hologram 302 at the reference angle, and the hologram 302 diffracts light ray 308 as shown in FIG. 5.

Although the concept of applying shear to a holographic film is discussed in a context of a single hologram/Bragg grating, such a concept may be equally applicable to all holograms recorded in the holographic film.

Continuing with FIGS. 2A-2B, in implementations of the optical system 200 that employ a holographic film 214 that is adjusted by applying different amounts of shear, the optical system 200 may include a shearing mechanism 220 configured to adjust an amount of shear applied to the holographic film 214. In particular, the controller 204 may control the shearing mechanism 220 to adjust the amount of shear applied to the holographic film.

Figure 7A:
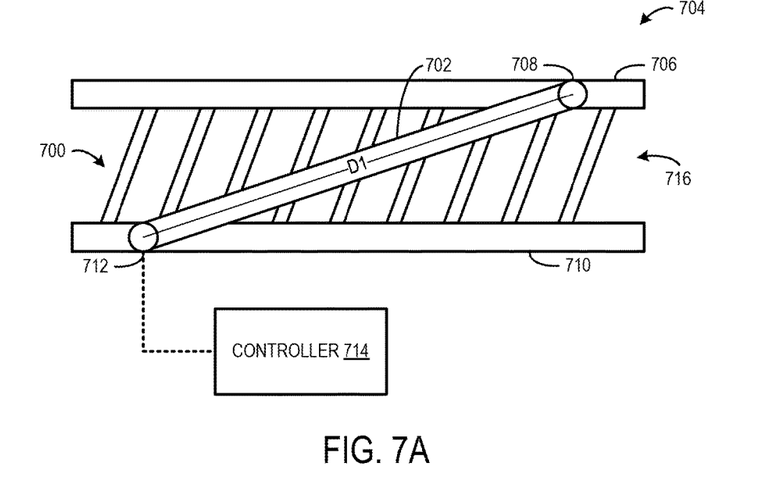
FIGS. 7A-7B show an example shearing mechanism.
Figure 7B:
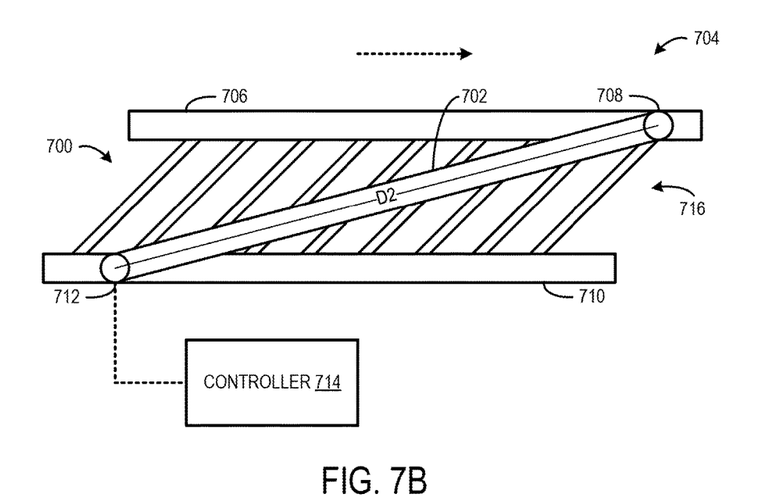

FIGS. 7A-7B show an example shearing mechanism 700. The shearing mechanism 700 includes one or more piezoelectric elements 702 connected to the holographic film 704. In particular, the piezoelectric element 702 may be connected (1) to a top surface 706 of the holographic film 704 at a first position 708, and (2) to a bottom surface 710 of the holographic film 704 at a second position 712. In FIG. 7A, a controller 714 applies a first voltage to the piezoelectric element 702 to apply a first amount of shear, in which the first and second positions 708 and 712 are separated by a first distance D1. This first amount of shear may place a hologram 716 of the holographic film 704 in an excited state, as shown in FIG. 5, in which the hologram diffracts image light inbound from the waveguide at the reference angle. In FIG. 7B, the controller 714 applies a second, different voltage to piezoelectric element 702 to apply a second, greater amount of shear. The second amount of shear causes the first and second positions 708 and 712 to separate by a second distance D2, which is greater than the first distance D1. In the depicted examples, the second amount of shear places the hologram 716 in a non-active state (FIG. 3), in which the hologram transmits, as opposed to diffracts, light.

The above described scenarios are meant to be non-limiting. The controller 714 may control the piezoelectric element 702 in any suitable manner to apply any suitable amount of shear to the holographic film 704. In one example, a 20 mm long piezoelectric element may be stretched/distorted up to 20 microns under a voltage of up to ~100 volts. Such a range of stretching/distortion may be suitable to apply different amounts of shear to the holographic film to excite any of the different holograms of the holographic film as desired.

Returning to FIG. 2, in an alternative implementation, the holographic film 214 may include a mixture of liquid crystals and polymer (e.g., UV curing polymer) in which holograms 216 are recorded. In this example implementation, the holographic film may be adjusted, not through variable shear, but instead by applying an electric field (e.g., a voltage) to the holographic film 214, so as to affect an orientation of the liquid crystals. In particular, the presence of the electric field may cause the liquid crystal molecules to be birefringent. Such a re-orientation of the liquid crystal molecules may have the same effect on light with appropriate linear polarization as a change in refractive index of the holographic film. Changing the apparent refractive index of the liquid crystal causes the average refractive index of the liquid crystal and the surrounding polymer to change. The change in the average refractive index causes the angle of the reference ray within the material to change (by Snells law). The change of the angle of the reference ray causes one of the recorded holograms to be selected/activated while the remainder of the holograms remain inactive. In other words, in such a configuration, different holograms may be selectively enabled/disabled by applying an appropriate voltage to the holographic film 214.

The plurality of holograms 216 may be stored in the liquid crystal and polymer mixture of the holographic film 214. Each hologram 216 may be recorded with the same reference beam. However, each hologram 216 may be activated at a different refractive index of the liquid crystal that is unique to the particular hologram in the holographic film 214. Moreover, the different refractive indices may cause the image light to be diffracted at different angles relevant to each recorded hologram.

In one particular example, a liquid crystal display (e.g., having approximate dimensions of 25 mm by 25 mm) is aligned with a lens (e.g., having a 25 mm focal length). A reference beam and signal, both planar wave fronts, are directed through the aligned components to create a desired holographic interference pattern. A thick photosensitive film, such as dichromated gelatin, is placed in the focal plane of the lens to record the interference pattern. The recording step may be repeated at distances of ~1 mm while modulating the liquid crystal display appropriately to achieve different refractive indices for each hologram.

In implementations of the optical system 200 that employ the holographic film 214 recorded in this manner, the state of the holographic film 214 may be adjusted to excite a particular hologram 216 by adjusting a voltage applied to the holographic film 214. For example, the controller 204 may apply a particular voltage to the liquid crystal structure of the holographic film 214 to adjust the refractive index of the liquid crystal structure to a selected refractive index corresponding to the particular hologram.

In some implementations, the controller 204 may control the image source 210 in conjunction with the holographic film 214. In particular, the controller 204 may momentarily turn off the image source 210 when the controller adjusts the state of the liquid crystal structure of the holographic film 214. Subsequently, once the state of the liquid crystal structure has changed, the controller 204 may turn the image source 210 back on. By controlling the image source 210 and the holographic film 214 in this manner, the user eye may not perceive any change in state of the holographic film 214.

Figure 8:
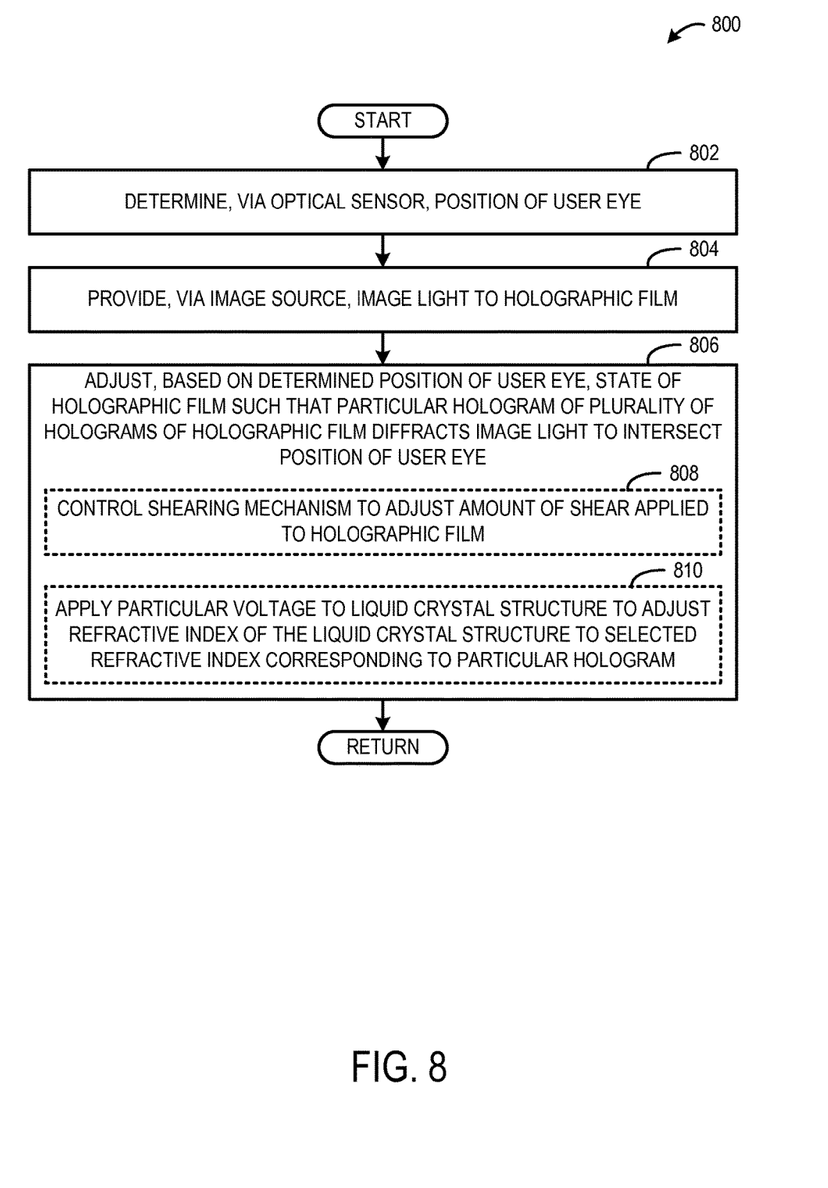
FIG. 8 shows an example method for projecting a hologram.

FIG. 8 shows an example method 800 for projecting an image. Method 800 may be performed by or on a display device such as HMD device 100 (FIG. 1). In general, method 800 may be performed by any suitable display device in which a holographic film is employed that has multiple holograms recorded differently into the film using a common reference beam.

At 802, method 800 includes determining, via an optical sensor, a position of a user eye. The position of the user eye may be determined in any suitable manner. In one example, a gaze vector of the user eye may be determined, as described above. In one example, the position of the user eye corresponds to a position of a pupil of the user eye.

At 804, the method 800 includes providing, via an image source, image light to a holographic film of the display device. In one example (FIG. 2), image light is provided from light source 210 to holographic film 214 via waveguide 212. The holographic film includes multiple holograms recorded with the same reference beam, but recorded differently to differently diffract image light received from the image source.

At 806, the method 800 includes adjusting, based on the determined position of the user eye, a state of the holographic film such that a particular one of the holograms diffracts image light to intersect the position of the user eye.

In some implementations, the holograms of the holographic film may be recorded while applying different amounts of shear to the holographic film during the recording of each hologram (or simulating such conditions in a master volume hologram). In some such implementations, at 808, the method 800 optionally may include controlling a shearing mechanism to adjust an amount of shear applied to the holographic film to adjust the state of the holographic film.

In some implementations, the holograms of the holographic film may be recorded in a liquid crystal structure (e.g., a liquid crystal and polymer mixture). In some such implementations, at 810, the method 800 optionally may include applying a particular voltage to the liquid crystal structure of the holographic film to adjust a refractive index of the liquid crystal structure to a selected refractive index corresponding to the particular hologram to adjust the state of the holographic film.

According to the above described method, a virtual image may be projected to a pupil of a user eye even as a position of the pupil changes across a range of motion of the pupil.

In some implementations, the methods and processes described herein may be tied to a computing system of one or more computing devices. In particular, such methods and processes may be implemented as a computer-application program or service, an application-programming interface (API), a library, and/or other computer-program product.

Figure 9:
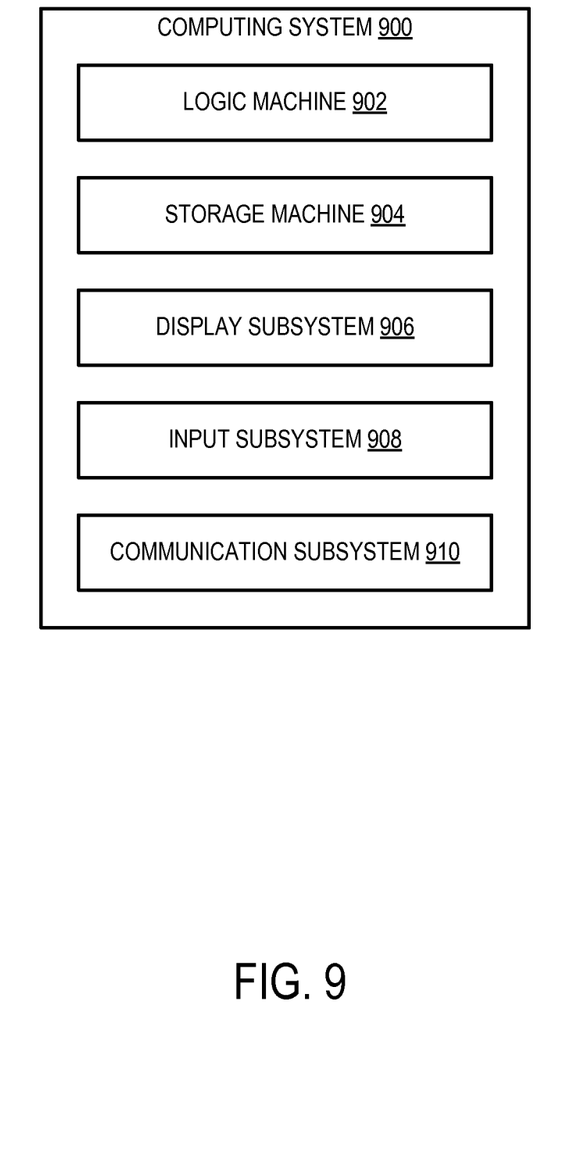
FIG. 9 shows an example computing system.

FIG. 9 schematically shows a non-limiting implementation of a computing system 900 that can enact one or more of the methods and processes described above. Computing system 900 is shown in simplified form. Computing system 900 may take the form of one or more personal computers, server computers, tablet computers, home-entertainment computers, network computing devices, gaming devices, mobile computing devices, mobile communication devices (e.g., smart phone), and/or other computing devices. For example, the computing system 900 may correspond to the HMD device 100 shown in FIG. 1.

Computing system 900 includes a logic machine 902 and a storage machine 904. Computing system 900 may optionally include a display subsystem 906, input subsystem 908, communication subsystem 910, and/or other components not shown in FIG. 9.

Logic machine 902 includes one or more physical devices configured to execute instructions. For example, the logic machine 902 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 902 may include one or more processors configured to execute software instructions. For example, such instructions maybe executed by logic machine 902 to process eye imaging data, determine an eye position based on the eye imaging data, and control a state of optical system 200 to provide image light to a user's eye at the determined eye position. Additionally or alternatively, the logic machine 902 may include one or more hardware or firmware logic machines configured to execute hardware or firmware instructions. Processors of the logic machine 902 may be single-core or multi-core, and the instructions executed thereon may be configured for sequential, parallel, and/or distributed processing. Individual components of the logic machine 902 optionally may be distributed among two or more separate devices, which may be remotely located and/or configured for coordinated processing. Aspects of the logic machine 902 may be virtualized and executed by remotely accessible, networked computing devices configured in a cloud-computing configuration.

Storage machine 904 includes one or more physical devices configured to hold instructions executable by the logic machine 902 to implement the methods and processes described herein. When such methods and processes are implemented, the state of storage machine 904 may be transformed—e.g., to hold different data.

Storage machine 904 may include removable and/or built-in devices. Storage machine 904 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 904 may include volatile, nonvolatile, dynamic, static, read/write, read-only, random-access, sequential-access, location-addressable, file-addressable, and/or content-addressable devices.

It will be appreciated that storage machine 904 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 902 and storage machine 904 may be integrated together into one or more hardware-logic components. For example, the logic machine 902 and the storage machine 904 may be integrated in the controller 104 shown in FIG. 1, the controller 204 shown in FIGS. 2A-2B, and/or the controller 714 shown in FIG. 7A-7B. In some implementations, the controllers 104, 204, and 714 may be implemented as purely hardware. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 906 may be used to present a visual representation of data held by storage machine 904. For example, the visual representation may include a virtual image. This visual representation may take the form of a graphical user interface (GUI). As the herein described methods and processes change the data held by the storage machine 904, and thus transform the state of the storage machine 904, the state of display subsystem 906 may likewise be transformed to visually represent changes in the underlying data. Display subsystem 906 may include one or more display devices utilizing virtually any type of technology. Such display devices may be combined with logic machine 902 and/or storage machine 904 in a shared enclosure, such as an HMD device, for example, or such display devices may be peripheral display devices.

When included, input subsystem 908 may comprise or interface with one or more user-input devices such as a keyboard, mouse, touch screen, or game controller. In some implementations, the input subsystem 908 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 910 may be configured to communicatively couple computing system 900 with one or more other computing devices. Communication subsystem 910 may include wired and/or wireless communication devices compatible with one or more different communication protocols. As non-limiting examples, the communication subsystem 910 may be configured for communication via a wireless telephone network, or a wired or wireless local- or wide-area network. In some implementations, the communication subsystem 910 may allow computing system 900 to send and/or receive messages to and/or from other devices via a network such as the Internet.

In another example implementation, a display device comprises an optical sensor configured to image a user eye, an image source configured to provide image light, a holographic film including a plurality of holograms, each hologram recorded with a same reference beam but recorded differently so as to differently diffract image light received from the light source, and a controller configured to 1) determine, via the optical sensor, a position of the user eye, and 2) adjust, based on the determined position of the user eye, a state of the holographic film such that a particular hologram of the plurality of holograms diffracts image light to intersect the position of the user eye. In one example implementation that optionally may be combined with any of the features described herein, each hologram is recorded with a different amount of shear applied to the holographic film. In one example implementation that optionally may be combined with any of the features described herein, non-active holograms other than the particular hologram do not diffract image light to the position of the user eye while the particular hologram diffracts image light to the position of the user eye. In one example implementation that optionally may be combined with any of the features described herein, the display device further comprises a shearing mechanism configured to adjust an amount of shear applied to the holographic film, and the state of the holographic film is adjusted by controlling the shearing mechanism to adjust the amount of shear applied to the holographic film. In one example implementation that optionally may be combined with any of the features described herein, the shearing mechanism includes one or more piezoelectric elements, and controlling the shearing mechanism to adjust the amount of shear applied to the holographic film includes adjusting a voltage applied to the one or more piezoelectric elements. In one example implementation that optionally may be combined with any of the features described herein, the holographic film comprises a liquid crystal structure having a refractive index that varies in accordance with a voltage applied to the liquid crystal structure, each of the plurality of holograms is recorded at a different refractive index of the liquid crystal structure, and the state of the holographic film is adjusted by applying a particular voltage to the liquid crystal structure to adjust the refractive index of the liquid crystal structure to a selected refractive index corresponding to the particular hologram. In one example implementation that optionally may be combined with any of the features described herein, the display further comprises a waveguide configured to propagate the image light from the image source to the holographic film, and the holographic film is adjacent the waveguide. In one example implementation that optionally may be combined with any of the features described herein, the display device is a near-eye display device. In one example implementation that optionally may be combined with any of the features described herein, the position of the user eye is a position of a pupil of the user eye.

In another example implementation, a near-eye display device comprises an optical sensor configured to image a user eye, an image source configured to provide image light, a waveguide configured to propagate image light from the image source to a field of view of a user eye, a holographic film adjacent the waveguide, the holographic film including a plurality of holograms, each hologram recorded with a same reference beam, but recorded differently so as to differently diffract image light received from the waveguide, and a controller configured to 1) determine, via the optical sensor, a position of the user eye, and 2) adjust, based on the determined position of the user eye, a state of the holographic film such that a particular hologram of the plurality of holograms diffracts image light to intersect the position of the user eye. In one example implementation that optionally may be combined with any of the features described herein, each hologram is recorded with a different amount of shear applied to the holographic film. In one example implementation that optionally may be combined with any of the features described herein, non-active holograms other than the particular hologram do not diffract image light to the position of the user eye while the particular hologram diffracts image light to the position of the user eye. In one example implementation that optionally may be combined with any of the features described herein, the near-eye display further comprises a shearing mechanism configured to adjust an amount of shear applied to the holographic film, and the state of the holographic film is adjusted by controlling the shearing mechanism to adjust the amount of shear applied to the holographic film. In one example implementation that optionally may be combined with any of the features described herein, the shearing mechanism includes one or more piezoelectric elements, and controlling the shearing mechanism to adjust the amount of shear applied to the holographic film includes adjusting a voltage applied to the one or more piezoelectric elements. In one example implementation that optionally may be combined with any of the features described herein, the holographic film comprises a liquid crystal structure having a refractive index that varies in accordance with a voltage applied to the liquid crystal structure, each of the plurality of holograms is recorded at a different refractive index of the liquid crystal structure, and the state of the holographic film is adjusted by applying a particular voltage to the liquid crystal structure to adjust the refractive index of the liquid crystal structure to a selected refractive index corresponding to the particular hologram. In one example implementation that optionally may be combined with any of the features described herein, the position of the user eye is a position of a pupil of the user eye.

In another example implementation, on a display device including a holographic film including a plurality of holograms, each hologram recorded with a same reference beam, but recorded differently to differently diffract image light, a method for projecting an image comprises determining, via an optical sensor, a position of a user eye, providing, via an image source, image light to the holographic film, and adjusting, based on the determined position of the user eye, a state of the holographic film such that a particular hologram of a plurality of holograms diffracts image light to intersect the position of the user eye. In one example implementation that optionally may be combined with any of the features described herein, the display device further comprises a shearing mechanism configured to adjust an amount of shear applied to the holographic film, and the state of the holographic film is adjusted by controlling the shearing mechanism to adjust the amount of shear applied to the holographic film. In one example implementation that optionally may be combined with any of the features described herein, the shearing mechanism includes one or more piezoelectric elements, and controlling the shearing mechanism to adjust the amount of shear applied to the holographic film includes adjusting a voltage applied to the one or more piezoelectric elements. In one example implementation that optionally may be combined with any of the features described herein, the holographic film comprises a liquid crystal structure having a refractive index that varies in accordance with a voltage applied to the liquid crystal structure, each of the plurality of holograms is recorded at a different refractive index of the liquid crystal structure, and the state of the holographic film is adjusted by applying a particular voltage to the liquid crystal structure to adjust the refractive index of the liquid crystal structure to a selected refractive index corresponding to the particular hologram.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A display device comprising:
an optical sensor configured to image a user eye;
an image source configured to provide image light;
a holographic film including a plurality of holograms, each hologram recorded with a same reference beam but recorded differently so as to differently diffract image light received from the light source, and each hologram being recorded with a different amount of shear applied to the holographic film; and
a controller configured to 1) determine, via the optical sensor, a position of the user eye, and 2) adjust, based on the determined position of the user eye, a state of the holographic film such that a particular hologram of the plurality of holograms diffracts image light to intersect the position of the user eye.

2. The display device of claim 1, wherein non-active holograms other than the particular hologram do not diffract image light to the position of the user eye while the particular hologram diffracts image light to the position of the user eye.

3. The display device of claim 1, further comprising:
a shearing mechanism configured to adjust an amount of shear applied to the holographic film, and wherein the state of the holographic film corresponds to the amount of shear applied to the holographic film.

4. The display device of claim 3, wherein the shearing mechanism includes one or more piezoelectric elements, and wherein adjusting the amount of shear applied to the holographic film includes adjusting a voltage applied to the one or more piezoelectric elements.

5. The display device of claim 1, further comprising:
a waveguide configured to propagate the image light from the image source to the holographic film, and wherein the holographic film is adjacent the waveguide.

6. The display device of claim 1, wherein the display device is a near-eye display device.

7. The display device of claim 1, wherein the position of the user eye is a position of a pupil of the user eye.

8. A near-eye display device comprising:
an optical sensor configured to image a user eye;
an image source configured to provide image light;
a waveguide configured to propagate image light from the image source to a field of view of a user eye;
a holographic film adjacent the waveguide, the holographic film including a plurality of holograms, each hologram recorded with a same reference beam, but recorded differently so as to differently diffract image light received from the waveguide, and each hologram being recorded with a different amount of shear applied to the holographic film; and
a controller configured to 1) determine, via the optical sensor, a position of the user eye, and 2) adjust, based on the determined position of the user eye, a state of the holographic film such that a particular hologram of the plurality of holograms diffracts image light to intersect the position of the user eye.

9. The near-eye display device of claim 8, wherein non-active holograms other than the particular hologram do not diffract image light to the position of the user eye while the particular hologram diffracts image light to the position of the user eye.

10. The near-eye display device of claim 8, further comprising:
a shearing mechanism configured to adjust an amount of shear applied to the holographic film, and wherein the state of the holographic film corresponds to the amount of shear applied to the holographic film.

11. The near-eye display device of claim 10, wherein the shearing mechanism includes one or more piezoelectric elements, and wherein adjusting the amount of shear applied to the holographic film includes adjusting a voltage applied to the one or more piezoelectric elements.

12. The near-eye display device of claim 8, wherein the position of the user eye is a position of a pupil of the user eye.

13. On a display device including a holographic film including a plurality of holograms, each hologram recorded with a same reference beam, but recorded differently to differently diffract image light, and each hologram being recorded with a different amount of shear applied to the holographic film, a method for projecting an image, the method comprising:
determining, via an optical sensor, a position of a user eye;
providing, via an image source, image light to the holographic film; and
adjusting, based on the determined position of the user eye, an amount of shear applied to the holographic film such that a particular hologram of a plurality of holograms diffracts image light to intersect the position of the user eye.

14. The method of claim 13, wherein the display device further comprises a shearing mechanism configured to adjust the amount of shear applied to the holographic film.

15. The method of claim 14, wherein the shearing mechanism includes one or more piezoelectric elements, and wherein adjusting the amount of shear applied to the holographic film includes adjusting a voltage applied to the one or more piezoelectric elements.

* * * * *